United States Patent [19]

Engstrom

[11] 4,142,129
[45] Feb. 27, 1979

[54] LAMP CHANGING SYSTEM FOR PROJECTORS

[75] Inventor: Anders Engstrom, Lindome, Sweden

[73] Assignee: Victor Hasselblad AB, Gothenburg, Sweden

[21] Appl. No.: 800,548

[22] Filed: May 25, 1977

[30] Foreign Application Priority Data

May 25, 1976 [SE] Sweden ............................ 7605954

[51] Int. Cl.² ...................... H05B 39/10; H05B 41/46
[52] U.S. Cl. ...................................... 315/89; 315/159
[58] Field of Search ................ 315/87, 88, 89, 90, 315/93, 154, 159, 313; 307/38, 39, 41, 117, 131; 340/251; 362/20, 254

[56] References Cited

U.S. PATENT DOCUMENTS

| | | | |
|---|---|---|---|
| 2,892,966 | 6/1959 | Smyth | 315/89 |
| 3,027,491 | 3/1962 | Seidler | 315/159 |
| 3,308,338 | 3/1967 | Seidler | 315/89 |
| 3,914,645 | 10/1975 | Li Donnici | 315/89 |
| 3,950,741 | 4/1976 | Schroeder | 340/251 |

*Primary Examiner*—Alfred E. Smith
*Assistant Examiner*—Robert E. Wise
*Attorney, Agent, or Firm*—Sherman and Shalloway

[57] ABSTRACT

A photocell illuminated by the projection lamp of a slide projector controls a spring-biased longitudinally movable lamp exchange carrier. Lamp failure causes a change of state in the photocell that electronically releases an electromagnetic lock and allows the spring-tensioned lamp carrier to change positions. The last spare lamp is screened from the photocell, causing the electronic circuit to energize a fluorescent diode to indicate that the last spare lamp is being used.

8 Claims, 1 Drawing Figure

LAMP CHANGING SYSTEM FOR PROJECTORS

This invention relates to projectors such as slide projectors and is concerned with a fully-automatic, electronically-controlled lamp exchange device which replaces a burnt-out projection lamp with a reserve lamp and simultaneously indicates that the reserve lamp has been put into use.

During the ongoing show of a film or slides a projection lamp extinguishes due to a burnt-out filament or another fault, the show is interrupted for lamp exchange. The majority of known film or slide projectors are equipped with only a single lamp socket, which necessitates a manual lamp exchange. The interruption for the lamp exchange then is disturbingly long even when a reserve lamp is readily available, which is not always the case. The additional cost and increase in size of the projector, which a stand by lamp-exhange lamp exchange device would imply, heretofore has not been regarded desirable. Because of a low fault-frequency, interruptions are relatively unusual and, normally, only one projector has been used. A rarely, occurring, relatively long interruption for lamp exchange can be tolarated under these circumstances.

Nowadays, a more advanced form of picture showing, a so-called picture play or multivision, particularly for the showing of slides, is practiced, in which several projectors are used simultaneously.

The special effect obtained by this form of picture show is, to a high degree, based on an accurately-programmed coordination between the projectors when they alternatingly and/or simultaneously show the pictures on a large projection screen. Interruption of this rhythm by a lamp fault is perceived by the spectators as very disturbing. Statistically, the risk of lamp faults increases simultaneously with the number of projectors. It is difficult and, in many cases, impossible to position all such projectors so that they are easily accessible for lamp exchange. Several known projectors, particularly slide projectors intended for such advanced picture display, therefore are provided with a lamp-exchange device utilizing two or more lamps. The lamps are mounted on either a linearly or rotary movable stand so that one lamp is located in operative position and the remaining lamps are in a reserve position. A faulty lamp is then replaced by a reserve lamp by means of a stepping mechanism, which moves the stand through one lamp division and thereby brings the reserve lamp into operative position in which the lamp is lighted by receiving current via a contact means.

Manual lamp-exchange devices as well as semi-automatic ones are known for projectors, which mainly are intended for professional use. The utilization of fully automatic lamp exchange devices substantially was restricted to film projectors installed in movie theaters where high requirements for trouble-free operation are to be met and, simultaneously, the additional expense for an automatic lamp exchange device is low in consideration of the high price of a movie-theater projector. It does not cause space problems, in these large stationary projectors, to include an automatic lamp-exchange device. It is further known to provide still projectors of the "over head" type with a relatively simple, automatic lamp-exchange device, on the motivation that projectors of this kind now are widely used in schools where they are operated by teachers and pupils who often do not know how to exchange a lamp. This projector type does not include a still changer, but it has a large area for the stills to be shown and, therefore, there is ample space for a lamp-exchange device. The conditions are quite different for slide projectors intended to show frame-mounted slides. A slide projector often is transported from one place to another and, therefore, is desired to be of compact design and light weight. Compared with the above-mentioned projector types, a slide projector is relatively cheap and, consequently, the costs involved in the inclusion of a lamp exchange device must be held low. As already mentioned, the demand of a lamp exchange device is restricted to projectors of advanced construction having an automatic frame changer. The apparatus of such a slide projector includes a lighting device, an automatic frame changer, a cooling fan, a lens and various switches and other small details. A compact design, therefore, leaves only very little space available for the introduction of a lamp exchange device. Lamp exchange devices in conventional slide projectors, therefore, are of a simple manual or semi-automatic type, which could be introduced into the projector at a moderate increase of price and dimensions. It is desired to provide slide projectors, which are intended for picture play or for repeatedly showing a picture program without attendance by an operator, as they are used e.g. in display-windows, museums etc., with an automatic lamp exchange device. It is further desired to design the automatic frame changer with dimensions so small as not to render greater dimensions of the slide projector necessary. The device, furthermore, should be simple, reliable and cheap. Finally, it should be provided with a means indicating when the ordinary lamp of the slide projector was replaced by a reserve lamp, in order to remind of the necessity of lamp exchange before the projector is used the next time. This indication function per se is known. Conventional automatic lamp exchange devices do not satisfactorily meet the aforesaid special requirements on a slide projector.

The present invention has the object to provide a projector, preferably a slide projector, with a fully automatic lamp exchange device, which is simple, rapid and reliable and requires a minimum of space. A further object of the invention is to provide the device with a means indicating when a reserve lamp has been put into use.

According to the invention, this object is achieved in that a photocell illuminated by the projection lamp of the slide projector controls an electronic circuit, which is connected to an electromagnetic lock. The lock controls the mechanics of the lamp exchange device, consisting of a lamp stand movable between two fixed stop members transversely of the optical axis of the slide projector. The lamp stand carries two projection lamps mounted in slightly-spaced relationship in the direction of movement. One the ordinary lamp and the other one is a reserve lamp. A spring tends to the lamp stand toward a first one of the fixed stop members, but is obstructed by the lock when the stand is in the position at the opposite stop member. With the spring tensioned and the lamp stand locked, the ordinary projection lamp is in the axis of the lighting arrangement of the projector. Upon release of the lock, the spring moves the lamp stand to the first stop member so that the reserve lamp then is in line. Sliding contacts for the lamps are arranged such, that the lamp in the use position receives current. Initially, when both lamps are without fault, the ordinary lamp is positioned in the light path, in which position the spring is tensioned and the lamp stand is locked by the electronically controlled electromagnetic lock. As long as the ordinary lamp is faultless and illuminates the photocell, the electronic circuit blocks the current supply of the lock, so that it blocks the lamp stand. When the ordinary or initial lamp extinguishes, the photocell is not illuminated and, consequently, the electronic circuit is so actuated that the electromagnetic lock receives current and releases the lamp stand. This stand then is moved by the spring to its opposite end position whereby the reserve lamp receives current and is lighted. Simultaneously the electronic circuit lights up a fluorescent diode in said circuit which indicates that the reserve lamp has been taken into use as the operative lamp, and that the original lamp is to be replaced at the next suitable occasion, at which occasion the lamp stand is to be returned to the original position. A fully automatic lamp exchange according to above takes about one second. The interruption is not perceived as disturbing, because a spectator only sees a twinkling corresponding to a slide change. The operation of the lamp exchange device in the desired manner presupposes such an arrangement of the electronic circuit that the electromagnetic lock for the lamp stand cannot be released until after the projection lamp has first achieved full light intensity. Otherwise, the electronic circuit would at the moment when the lamp is being lighted, react in the same way as when the projection lamp extinguishes, whereby an unwanted false lamp exchange would occur.

BRIEF DESCRIPTION OF THE DRAWINGS

The invention is described in greater detail in the following, with reference to the accompanying FIG. 1 drawing, in which a preferred embodiment of the invention is shown.

DETAILED DESCRIPTION OF THE PREFERRED EMBODIMENT

Figure 1:
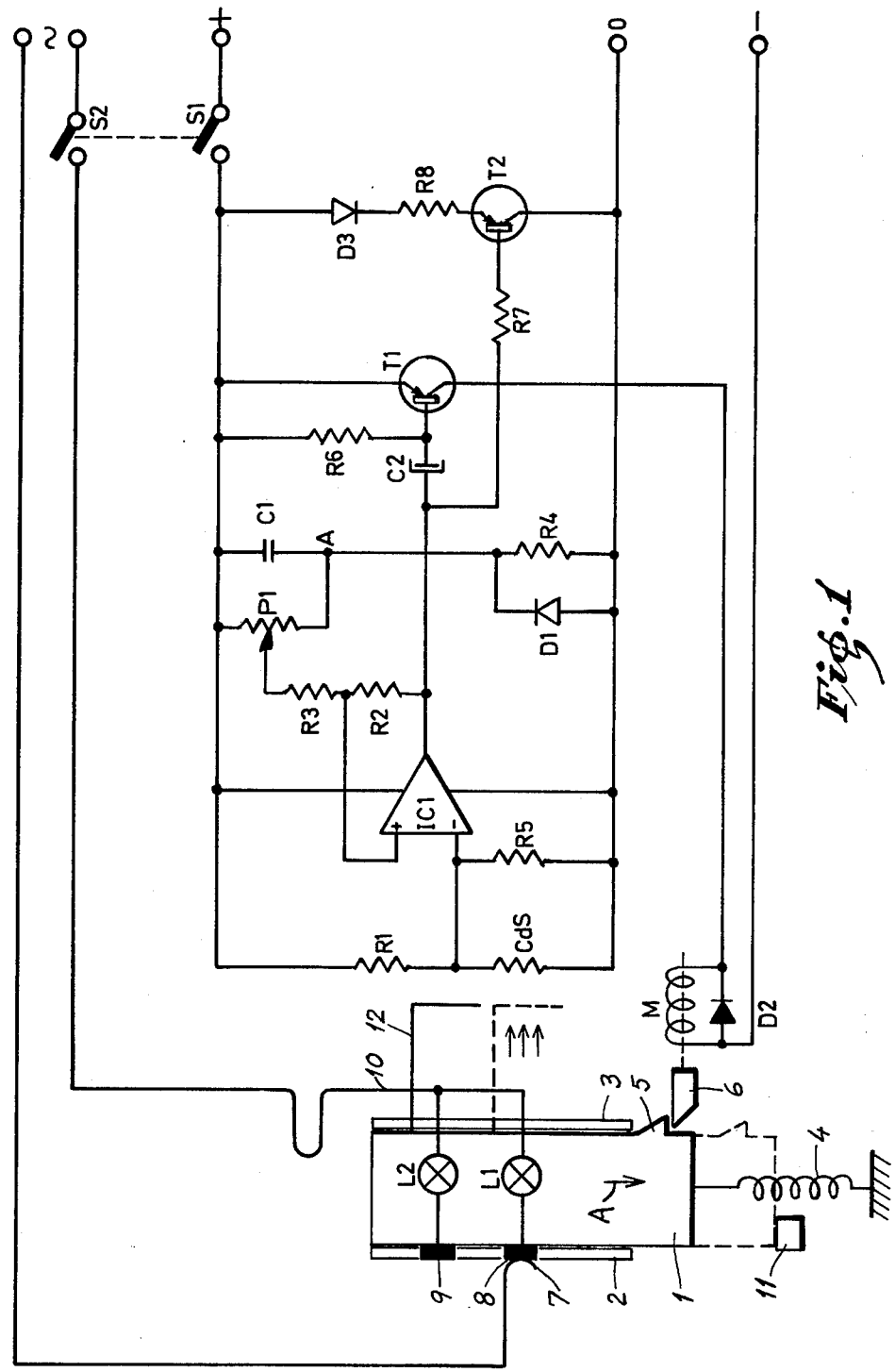

A lamp stand 1 is mounted to be movable in its longitudinal direction perpendicularly to the ray path of a slide projector. Two projection lamps L1 and L2 are arranged slightly spaced apart in the longitudinal direction of the lamp stand. L1 is the ordinary or initial lamp of the slide projector, and L2 is a reserve lamp, which by automatic movement of the lamp stand 1 is to assume the position and function of the lamp L1 when the lamp L1 extinguishes during the course of a slide show. The lamp stand 1 moves in guides 2, 3 between two end positions spaced apart a distance corresponding to the distance between centers of the lamps L1 and L2. A draw spring 4 clamped at one end is coupled to the lamp stand 1 and tends to pull the stand in the direction of the arrow. As shown, the lamp stand 1 is displaced to its end position remote from the spring 4 where it is retained against the pulling force of the spring 4 by a lock consisting of a beveled locking tooth 5 disposed on the lamp stand 1 and embracing a beveled armature pin 6 of an electromagnet M. The initial lamp L1 is thus in operating position and the lamp L2 in reserve position. The lamp L1 receives current, from a current source from the electronic part of the device, via a stationary contact spring 7 and a sliding contact 8 disposed on the lamp stand 1, on one side, and a sufficiently long flexible conductor 10 common to the lamps L1 and L2, on the other side. The lamp L2 is also provided with a corresponding sliding contact 9.

The magnet M is currentless as long as the lamp L1 is lighted, but receives a current impulse and draws the armature 6 when the lamp L1 extinguishes. Upon drawing of the pin 6, it is released from the locking tooth 5, whereby the spring 4 moves the lamp stand 1 to its other end position where it is stopped by a fixed stop member 11. A suitable cushion or brake means (not shown) dampens the strike against the stop member 11. The lamp L2 has now been moved to the original position of the lamp L1 and is supplied with current via the contact spring 7 and its sliding contact 9 and is lighted. At a suitable occasion after the slide show, the faulty lamp L1 is replaced by a new one, and the lamp stand 1 is pressed back to the original position where the locks 5, 6 again become operative.

The electronic part of the invention is fed from a separate direct-current source (not shown), which represented by three inputs, +, 0 and −. Two mechanically-interconnected switches S1, S2 are provided to simultaneously switch the electronic circuit and the lamp circuit respectively. A CdS photocell is disposed so that it is illuminated by the ordinary lamp L1 when this lamp is in operative position A screen 12 coupled to the lamp stand 1 prevents light of the reserve lamp L2 from hitting the photocell when the reserve lamp L2 is operative, as shown by the dashed line. A first voltage divider, consisting of a resistance R1 and the photocell CdS with an adaptation resistance R5 connected in parallel, is connected at its centre to the negative (−) input of an operation amplifier IC1. The positive (+) input of the operation amplifier IC1 is connected via a series resistance R3 to the movable contact of a potentiometer P1. For positive feed-back, a resistance R2 is connected between the positive (+) input of the operation amplifier IC1 and the output thereof. The potentiometer P1 and a resistance R4 form a second voltage divider. An electrolytic capacitor C1 is connected in parallel with the potentiometer P1, and a diode D1 is connected in parallel with the resistance R4. The base of a PNP-transistor T1 is connected via an electrolytic capacitor C2 to the output of the operation amplifier IC1. The emitter of the transistor T1 is connected to the plus-pole of the current source, and its collector is connected to the coil of the magnet M. A resistance R 6 connected between the emitter and the base throttles the transistor T1. To the output of the operation amplifier IC1 the base of a PNP-transistor T2 is connected. A fluorescent diode D3 in series with a resistance R8 are connected between the plus pole of the current source and the emitter of the transistor T2. The collector of the transistor T2 is connected to the zero conductor of the current source. The other connection of the magnet coil M is coupled to the minus-pole of the current source. A diode D2 is connected in parallel with the magnet coil M.

The device according to the invention operates as follows. When the ordinary lamp L1 is faultless and illuminates the CdS photocell, the resistance thereof is low in relation to the resistance R1. Consequently, the level of the minus (−) input of the operation amplifier IC1 is lower than the level of the plus (+) input, which level is determined by the voltage divider P1, R4. The output voltage of the operation amplifier IC1 thereby becomes high, whereby the transistor T1 throttled by the resistance R6 blocks, and the magnet M does not receive current. Upon a fault arising on the lamp L1 and causing the lamp to extinguish, the photocell is not illuminated and its resistance thereby becomes high. As a result, the level of the minus (−) input is higher than the level of the plus (+) input of the operation amplifier IC1. This results in an initial drop of the output voltage on IC1, and by positive feed-back via the resistances R2, R3 the change in the output voltage is coupled to the plus (+) input whereby the speed of change increases. The resulting negative voltage leap is coupled via the capacitor C2 to the transistor T1, which becomes conductive and emits a short current impulse to the electromagnet M. When the magnet M receives current and attracts the armature pin 6, the lock is released, whereby the lamp stand 1 is moved to the position shown by dashed lines in the FIGURE, and the reserve lamp L2 is lighted.

When the lamp L1 is first lighted by means of the switch S2, the lamp L1 is dark for the first moment, which could release an unwanted, false lamp exchange according to above. This is prevented by the capacitor C1 and resistance R4 which delay the release. The voltage above the capacitor C1 at the first moment is zero, whereby a point A receives the same potential as the plus (+) pole of the current source. The capacitor C1 is charged via the resistance R4, whereby the voltage in the point A drops to a value, which is determined by the voltage divider P1, P4. The voltage on the sliding contact of the potentiometer P1 drops in a corresponding degree, and the minus (−) input of the operation amplifier, therefore, does not receive a voltage exceeding that of its plus (+) input until after a certain lag time, after which the transistor T1 can be caused to conduct and the magnet M to draw. The sizes of the components C1, R1 are so chosen that the lamp L1 achieves full light intensity before the voltage in the point A has dropped to its final value, which prevents a false lamp exchange.

When a lamp exchange has taken place the screen 12 assumes the position indicated by the dashed line, whereby the light from the lamp L2 is screened from the photocell, the resistance of which remains high. As a result, the output level of the operation amplifier IC1 remains low, so that the transistor T2 is conductive. With the transistor T2 being conductive, the fluorescent diode D3 is lighted and indicates that a lamp exchange has taken place.

The invention can be modified in the details thereof to suit different projector types or lighting arrangements. The lamp stand 1, for example, can be equipped with further reserve lamps in addition to the two shown, in which case additional locking teeth 5 are to be provided. It also is possible to arrange the lamps on a rotary stand and to let the magnet M actuate a stepping mechanism of known type.

I claim:
1. An automatic lamp-changing system for projectors incuding
   (a) a longitudinally movable lamp carrier, said lamp carrier having
   (b) at least two lamp stations longitudinally spaced from each other in the direction of movement of said lamp carrier, each lamp station having a sliding contact,
   (c) index means for indexing said lamp carrier in a plurality of successive service positions corresponding to the number of lamp stations on said lamp carrier,
   (d) biasing means for biasing said lamp carrier from one service position to a succeeding service position, said indexing means including
   a lock having
   (e) an electromagnetic lock release,
   (f) an electronic control circuit including
   (g) a photosensitive CdS cell positioned to receive light from a lamp in the service position,
   (h) release means in said circuit responsive to a change in current in said photosensitive CdS cell to energize said electromagnetic lock release, whereby the bias means is free to move said lamp carrier to a succeeding service position,
   (i) a stationary contact spring disposed adjacent the sliding contacts on the lamp carrier, said spring supplying a current to the sliding contact of the lamp station in the service position, and
   (j) a first switch controlling the current supplied to the lamp stations and a second switch controlling the current supplied to the electronic control circuit, said first and second switches interconnected for simultaneous operation.

2. The automatic lamp-changing system of claim 1 in which said control circuit includes means for delaying said release means.

3. The automatic lamp-changing system of claim 1 in which said control circuit includes a light-emitting element in a circuit responsive to a change in current in said CdS cell, and said lamp carrier includes a mask positioned adjacent the last of the lamp stations to obscure said CdS cell.

4. The automatic lamp-changing system of claim 1 wherein said electronic control circuit is further comprised of:
   (a) a first voltage divider consisting of a resistance and an adaptation resistance in parallel with said photosensitive CdS cell;
   (b) an amplifier having an output, a negative input connected to said first voltage divider, and a positive input connected to a potentiometer connected to a direct current source;
   (c) a positive feedback connecting the positive input and the output of the amplifier;
   (d) first and second transistors, each having a base, emitter and collector, each base connected to the output of the amplifier, each emitter connected between said potentiometer and the direct current source, the first transistor collector connected to said electromagnetic lock release, and the second transistor collector connected to the direct current source; and
   (e) a resistor connected to said potentiometer and said second transistor collector, forming a second voltage divider.

5. The automatic lamp-changing of claim 4 in which said control circuit includes means for delaying said release means.

6. The automatic lamp-changing system of claim 5 wherein said means for delaying said release means is a resistance connected between the emitter and base of the first transistor.

7. The automatic lamp-changing system of claim 6 in which said control circuit includes a light-emitting element in a circuit responsive to a change in current in said CdS cell, and said lamp carrier includes a mask positioned adjacent the last of the lamp stations to obscure said CdS cell.

8. The automatic lamp-changing system of claim 2 wherein said means for delaying said release means is a resistance connected between the emitter and base of the first transistor.

* * * * *